United States Patent
Tang (10) Patent No.: US 11,201,717 B2
(45) Date of Patent: Dec. 14, 2021

(54) SIGNAL TRANSMISSION METHOD AND APPARATUS

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/331,109

(22) PCT Filed: Sep. 21, 2016

(86) PCT No.: PCT/CN2016/099609
§ 371 (c)(1),
(2) Date: Mar. 6, 2019

(87) PCT Pub. No.: WO2018/053720
PCT Pub. Date: Mar. 29, 2018

(65) Prior Publication Data
US 2019/0238300 A1 Aug. 1, 2019

(51) Int. Cl.
*H04L 5/00* (2006.01)
*H04W 72/02* (2009.01)
(Continued)

(52) U.S. Cl.
CPC .......... *H04L 5/0092* (2013.01); *H04L 5/0007* (2013.01); *H04L 5/0053* (2013.01);
(Continued)

(58) Field of Classification Search
CPC .............. H04W 74/0833; H04W 48/16; H04L 27/26025; H04L 5/0092; H04L 5/0007; H04L 5/0053
See application file for complete search history.

(56) References Cited

U.S. PATENT DOCUMENTS 9,386,578 B2 7/2016 Holtzman et al.
2013/0286918 A1* 10/2013 Park ..................... H04W 72/121
370/311
(Continued)

FOREIGN PATENT DOCUMENTS

CN 103826310 A 5/2014
CN 104981021 A 10/2015
(Continued)

OTHER PUBLICATIONS

Nokia et al: "Channel structure for contention based access", 3GPP Draft; R1-167254, vol. RAN WG1, no. Gothenburg, Sweden; 20160822-20160826; Aug. 21, 2016 (Aug. 21, 2016), XP051125793.
(Continued)

*Primary Examiner* — Omer S Mian
(74) *Attorney, Agent, or Firm* — Perkins Coie LLP (57) ABSTRACT

Provided in the embodiments of the present invention are a signal transmission method and apparatus, the method comprising: a terminal device, according to a first resource pool used in transmitting a first signal, determining a target base parameter set of the first signal; the terminal device transmitting the first signal on a transmission resource of the first resource pool on the basis of the target base parameter set, which may improve flexibility in selecting a base parameter set to a certain extent.

7 Claims, 1 Drawing Sheet

(51) Int. Cl.
*H04W 72/04* (2009.01)
*H04L 27/26* (2006.01)

(52) U.S. Cl.
CPC ...... *H04L 5/0091* (2013.01); *H04L 27/26025* (2021.01); *H04W 72/02* (2013.01); *H04W 72/042* (2013.01); *H04W 72/0486* (2013.01)

(56) References Cited

U.S. PATENT DOCUMENTS

| | | |
|---|---|---|
| 2016/0366676 A1 | 12/2016 | Fujishiro et al. |
| 2016/0366677 A1 | 12/2016 | Fujishiro et al. |
| 2017/0041916 A1* | 2/2017 | Soret .................... H04W 8/005 |
| 2017/0118054 A1* | 4/2017 | Ma ........................ H04L 5/0064 |
| 2017/0164350 A1 | 6/2017 | Feifei |
| 2018/0262378 A1* | 9/2018 | Ma ........................ H04L 5/0094 |
| 2019/0013982 A1 | 1/2019 | Feifei |
| 2019/0044782 A1 | 2/2019 | Zeng et al. |
| 2019/0132838 A1 | 5/2019 | Yi et al. |
| 2019/0182872 A1* | 6/2019 | Chen .................... H04W 48/16 |
| 2019/0262378 A1 | 8/2019 | Akao |

FOREIGN PATENT DOCUMENTS

| | | |
|---|---|---|
| CN | 105101042 A | 11/2015 |
| CN | 105682242 A | 6/2016 |
| JP | 2011526468 A | 10/2011 |
| RU | 2464711 C2 | 10/2012 |
| RU | 2505946 C2 | 1/2014 |
| WO | 2015067196 A1 | 5/2015 |
| WO | 2015109441 A1 | 7/2015 |
| WO | 2015167379 A1 | 11/2015 |
| WO | 2016004634 A1 | 1/2016 |
| WO | 2016004901 A1 | 1/2016 |
| WO | 2016009480 A1 | 1/2016 |
| WO | 2016072469 A1 | 5/2016 |
| WO | 2016119502 A1 | 8/2016 |
| WO | 2016192644 A1 | 12/2016 |
| WO | 2017132985 A1 | 8/2017 |
| WO | 2017188803 A2 | 11/2017 |

OTHER PUBLICATIONS

Supplementary European Search Report in the European application No. 16916459.7, dated Aug. 7, 2019.
English translation of the Written Opinion of the International Search Authority in the international application No. PCT/CN2016/099609, dated Jun. 8, 2017.
International Search Report in international application No. PCT/CN2016/099609, dated Jun. 8, 2017.
Written Opinion of the international Search Authority in international application No. PCT/CN2016/099609, dated Jun. 8, 2017.
First Office Action of the Russian application No. 2019111941, dated Mar. 18, 2020.
Written Opinion of the Singaporean application No. 11201902516P, dated Mar. 28, 2020.
First Office Action of the Chinese application No. 201680089443.X, dated Apr. 16, 2020.
First Office Action of the Canadian application No. 3037576, dated Apr. 17, 2020.
First Office Action of the European application No. 16916459.7, dated Apr. 20, 2020.
Decision of Re-examination of the Taiwanese application 106128831, dated Apr. 29, 2021.
Second Office Action of the Canadian application No. 3037576, dated Mar. 3, 2021.
Second Office Action of the European application No. 16916459.7, dated Mar. 2, 2021.
Second Office Action of the Chinese application No. 201680089443.X, dated Jul. 3, 2020.
First Office Action of the Brazilian application No. BR1120190055100, dated Sep. 1, 2020.
First Office Action of the Chilean application No. 201900733, dated Feb. 19, 2020.
Huawei, HiSilicon; Comparison and evaluation on scaling factors for subcarrier spacing; 3GPP TSG RAN WG1 Meeting #86 R1-166101, Gothenburg, Sweden Aug. 22-26, 2016.
First Office Action of the Japanese application No. 2019-515618, dated Oct. 20, 2020.
Office Action of the Indian application No. 201917015570, dated Oct. 31, 2020.
Decision of Rejection of the Chinese application No. 201680089443.X, dated Oct. 12, 2020.
First Office Action of the Israeli application No. 265527, dated Nov. 12, 2020.
Second Office Action of the Chilean application No. 201900733, dated Nov. 6, 2020.
Office Action of the Taiwanese application No. 106128831, dated Dec. 11, 2020.
Notice of Re-Examination of the Chinese application No. 201680089443.X, dated May 31, 2021.
Office Action of the Australian application No. 2016423565, dated Jul. 21, 2021.
Review decision of the Chinese application No. 201680089443.X, dated Sep. 2, 2021. 21 pages with English translation.

* cited by examiner

SIGNAL TRANSMISSION METHOD AND APPARATUS

CROSS-REFERENCE TO RELATED APPLICATION

The present application is the U.S. national phase application of PCT Application No. PCT/CN2016/099609 filed on Sep. 21, 2016, the disclosure of which is incorporated herein in its entirety by reference.

TECHNICAL FIELD

The disclosure relates to the field of communications, and in particular to a method and an apparatus for transmitting a signal in the field of communications.

BACKGROUND

A contention-based uplink access manner will be introduced in a future communication system to allocate a special resource pool for a terminal device. The special resource pool corresponds to a fixed numerology. Under a condition in which no network device is scheduled, the terminal device may acquire resources in the resource pool in a contention manner to perform random access, or may acquire resources in the resource pool in a contention manner to transmit data. However, it is possible that the terminal device does not need the fixed numerology but other basic numerologies. Therefore, how to select a numerology is a problem to be solved urgently. For example, the terminal device may support different service types, and the different service types need different basic numerologies; and if the numerology of the terminal device is fixed, it is difficult to meet the requirements of the terminal to transmit different services.

SUMMARY

Embodiments of the disclosure provide a method and an apparatus for transmitting a signal, which may improve the flexibility to select a numerology.

A first aspect provides a method for transmitting a signal, which may include: a terminal device determines, according to a first resource pool for transmitting a first signal, a target numerology for transmitting the first signal; and the terminal device transmits the first signal on a transmission resource of the first resource pool based on the target numerology.

Therefore, the terminal device may obtain the target numerology corresponding to the first resource pool and then the terminal device transmits the first signal based on the target numerology by using the transmission resource in the first resource pool. In this way, the terminal device may determine the target numerology corresponding to the resource pool, so as to avoid the terminal device from being allocated a fixed numerology as in the prior art. Since the terminal device may determine the target numerology corresponding to the first signal according to the first resource pool, the flexibility of the terminal device to select the numerology may also be improved.

Further, different basic numerologies may be selected for different services. For example, when the first signal is a first service type, a first numerology is selected; and when the first signal is a second service type, a second numerology is selected. In this way, the requirements of different services can be met.

In a first possible implementation of the first aspect, each numerology in the at least one numerology and/or the target numerology includes at least one of the following: a subcarrier spacing, the number of subcarriers included in a system bandwidth, the number of subcarriers included in a Physical Resource Block (PRB), the length of an Orthogonal Frequency Division Multiplexing (abbreviated as "OFDM") symbol, the number of points of Fourier transform such as Fast Fourier Transform (abbreviated as "FFT") or Inverse Fast Fourier Transform (abbreviated as "IFFT") for generating an OFDM signal, the number of OFDM symbols included in a Transmission Time Interval (abbreviated as "TTI", the number of TTIs included in a first time period, and a type of a Cyclic Prefix (abbreviated as "CP") of the first signal. The subcarrier spacing is a frequency spacing between adjacent subcarriers, such as 15 kHz and 60 kHz. The number of subcarriers under a special bandwidth may be, for example, the number of subcarriers corresponding to each possible system bandwidth. The number of subcarriers included in the PRB may typically be, for example, an integer multiple of 6 or 16. The number of OFDM symbols in the TTI may typically be, for example, an integer multiple of 2, 4 and 7 or may be an integer multiple of 14.

The number of TTIs included in the first time period may be the number of TTIs included in a time length of 1 ms or 10 ms. The CP of the first signal may be a normal CP or an extended CP. The numerology may further include: a time length of the CP of the first signal.

Alternatively, each numerology in the at least one numerology and/or the target numerology may further include: a basic parameter in a newly defined resource partitioning manner in a future network system; for example, the basic parameter may be a basic frequency domain unit, a basic frequency domain unit pattern, a subcarrier pattern, a position occupied by a reference symbol in a time domain unit, a TTI pattern within a unit period, a pattern of a sub-frame in a frame, a pattern of a time slot in the sub-frame and an OFDM pattern in the time slot, etc.

In combination with the above possible implementations of the first aspect, in a second possible implementation of the first aspect, before the terminal device determines, according to the first resource pool for transmitting the first signal, the target numerology for transmitting the first signal, the method may further include: the terminal device acquires a mapping relationship between at least one resource pool and at least one numerology, where the mapping relationship is used for indicating that each resource pool in the at least one resource pool is mapped to one numerology in the at least one numerology, and the at least one resource pool includes the first resource pool; and the operation that a terminal device determines, according to a first resource pool for transmitting a first signal, a target numerology for transmitting the first signal includes: the terminal device determines the target numerology for transmitting the first signal from the at least one numerology according to the first resource pool and the mapping relationship.

Alternatively, the mapping relationship between the at least one resource pool and the at least one numerology may be that one resource pool in the at least one resource pool corresponds to one numerology, or one numerology may be mapped to one or more resource pools, i.e., different resource pools may be mapped to a same numerology.

In combination with the above possible implementations of the first aspect, in a third possible implementation of the first aspect, that the terminal device acquires a mapping relationship between at least one resource pool and at least one numerology includes: the terminal device receives first indication information from a network device, where the first indication information is used for indicating the mapping relationship; and the terminal device acquires the mapping relationship between the at least one resource pool and the at least one numerology according to the first indication information.

Alternatively, the terminal device may receive the first indication information from the network device via user dedicated signaling; the terminal device may also receive the first indication information from the network device via broadcast signaling; the terminal device may also receive the first indication information from the network device via Downlink Control Information (abbreviated as "DCI"); and of course, the terminal device may also receive the first indication information from the network device via other manners.

In combination with the above possible implementations of the first aspect, in a fourth implementation of the first aspect, before the terminal device determines, according to the first resource pool for transmitting the first signal, the target numerology for transmitting the first signal, the method may further include: the terminal device determines the first resource pool for transmitting the first signal, where the at least one resource pool includes the first resource pool.

In combination with the above possible implementations of the first aspect, in a fifth implementation of the first aspect, that the terminal device determines the first resource pool for transmitting the first signal includes at least one of the following: the terminal device determines the first resource pool for transmitting the first signal according to a service type of the first signal; or, the terminal device determines the first resource pool for transmitting the first signal according to a frequency band for transmitting the first signal; or the terminal device determines the first resource pool for transmitting the first signal according to a path loss parameter between the terminal device and the network device.

In combination with the above possible implementations of the first aspect, in a sixth implementation of the first aspect, the operation that the terminal device determines the first resource pool for transmitting the first signal includes: the terminal device receives second indication information from the network device, where the second indication information is used for indicating the first resource pool for transmitting the first signal; and the terminal device determines the first resource pool for transmitting the first signal according to the second indication information.

Specifically, the network device may indicate the first resource pool used by the terminal device to transmit the first signal by transmitting the second indication information to the terminal device. Alternatively, the terminal device may receive the second indication information from the network device via the user dedicated signaling, or the terminal device may receive the second indication information from the network device via the broadcast signaling, or the terminal device may receive the second indication information from the network device via the DCI. Of course, the terminal device may also receive the second indication information from the network device via other manners.

In combination with the above possible implementations of the first aspect, in a seventh implementation of the first aspect, the operation that the terminal device determines the first resource pool for transmitting the first signal includes: the terminal device detects a second signal except for the first signal, and determines a resource pool, where the second signal is arranged, to be the first resource pool for transmitting the first signal. That is, the terminal device may detect a resource pool used by other signal except for the terminal device's own signal that needs to be transmitted, and may take the resource pool of the other signal to be the terminal device's own first resource pool.

In combination with the above possible implementations of the first aspect, in an eighth implementation of the first aspect, the operation that the terminal device determines the first resource pool for transmitting the signal includes the following operations.

The operation that the terminal device determines the first resource pool for transmitting the first signal includes the following operations.

The terminal device randomly selects one resource pool from the at least one resource pool as the first resource pool for transmitting the first signal.

Or, the terminal device determines a resource pool index based on transmission parameters of the terminal device, and determines the first resource pool for transmitting the first signal from the at least one resource pool according to the resource pool index.

Or, the terminal device performs load measurement on the at least one resource pool based on loads and selects a resource pool with a minimum load or a resource pool smaller than a first threshold value, to be the resource pool for transmitting the first signal.

Specifically, the terminal device may randomly select one resource pool from the at least one resource pool, to be the terminal device's own first resource pool; or the terminal device may calculate the resource pool index according to the terminal device's own transmission parameters such as a Radio Network Temporary Identity (RNTI) or a cell identity of the terminal device and the like, and then determine the first resource pool from the at least one resource pool according to the resource pool index, or the terminal device may perform the load measurement on the at least one resource pool, and may select the resource pool with the minimum load from the at least one resource pool to be the first resource pool, for example, the terminal device may measure the magnitudes of signal receiving powers in the at least one resource pool and selects a resource pool with a minimum average signal receiving power to be the first resource pool; if there are a plurality of resource pools with the minimum average signal receiving power, any resource pool may be selected from the resource pools with the minimum average power to be the first resource pool, and of course, any resource pool with the average signal receiving power smaller than a preset threshold value may also be selected to be the first resource pool.

In combination with the above possible implementations of the first aspect, in a ninth implementation of the first aspect, the operation that the terminal device transmits the first signal on a transmission resource of the first resource pool based on the target numerology includes the following operations.

The terminal device randomly selects the transmission resource from at least one transmission resource included in the first resource pool based on the target numerology, to transmit the first signal.

Or, the terminal device determines a transmission resource index based on transmission parameters of the terminal device and determines the transmission resource for transmitting the first signal from the at least one transmission resource included in the first resource pool according to the transmission resource index, and the terminal device transmits the first signal on the transmission resource for transmitting the first signal based on the target numerology.

Or, the terminal device determines the transmission resource for transmitting the first signal from the at least one transmission resource included in the first resource pool for transmitting the first signal according to a pre-configured transmission resource index, and the terminal device transmits the first signal on the transmission resource for transmitting the first signal based on the target numerology.

Or, the terminal device performs load measurement on the at least one transmission resource included in the first resource pool, and selects a transmission resource with a minimum load or a transmission resource smaller than a second threshold value from the at least one transmission resource included in the first resource pool, and the terminal device transmits the first signal on the transmission resource with the minimum load or the transmission resource smaller than the second threshold value based on the target numerology.

Specifically, the first resource pool includes the at least one transmission resource. Concerning how to determine the transmission resource for transmitting the first signal from the first resource pool, four manners may be provided. The first manner is to randomly select one transmission resource from the at least one transmission resource to transmit the first signal. The second manner is to calculate the transmission resource index according to the transmission parameters of the terminal device, for example, the transmission parameters may be the RNTI of the terminal device or the cell identity of the terminal device, and determines the resource for transmitting the first signal from at least one transmission resource included in a target first resource pool according to the transmission resource index. The third manner is that the terminal device keeps the pre-configured transmission resource index, and the terminal device determines the resource for transmitting the first signal from the at least one transmission resource according to the pre-configured transmission resource index. The fourth manner is that the terminal device may perform measurement on the at least one transmission resource included in the first resource pool and select the transmission resource with the minimum load to be the resource for transmitting the signal; for example, the terminal device measures the signal receiving power of each transmission resource in the at least one transmission resource included in the first resource pool, and selects the transmission resource with the minimum average signal receiving power to be the resource for transmitting the first signal; and if there are a plurality of transmission resources with the minimum average signal receiving power, any transmission resource may be selected from the plurality of transmission resources to transmit the first signal.

In combination with the above possible implementations of the first aspect, in a tenth implementation of the first aspect, the first resource pool and/or each resource pool in the at least one resource pool includes at least one transmission resource; each transmission resource in the at least one transmission resource includes: a physical time frequency resource and/or a sequence resource, where the sequence resource may be a sequence in a sequence group, or may be a codeword in a codebook, or may be an interlaced pattern. Still further, transmission resources in each resource pool in the at least one resource pool are orthogonal to each other; each resource pool in the at least one resource pool is orthogonal to each other, which may mean that the physical time frequency resources are orthogonal to each other, or the sequence resources are orthogonal to each other, or may mean that the physical time frequency resources are orthogonal to each other and the sequence resources are orthogonal to each other.

In combination with the above possible implementations of the first aspect, in an eleventh implementation of the first aspect, the first signal is a random access signal or a digital signal or an uplink control signal.

A second aspect provides a method for transmitting a signal, which may include: a network device transmits first indication information to a terminal device, where the first indication information is used for indicating a mapping relationship so that the terminal device acquires the mapping relationship between at least one resource pool and at least one numerology according to the first indication information, and the mapping relationship is used for indicating that each resource pool in the at least one resource pool is mapped to one numerology in the at least one numerology.

In a first possible implementation of the second aspect, the network device transmits second indication information to the terminal device, where the second indication information is used for indicating a first resource pool for transmitting a first signal, so that the terminal device determines the first resource pool for transmitting the first signal according to the second indication information.

A third aspect provides an apparatus for transmitting a signal, which is configured to execute the method in the first aspect or any possible implementation of the first aspect. Specifically, the apparatus includes a unit configured to execute the method in the first aspect or any possible implementation of the first aspect.

A fourth aspect provides an apparatus for transmitting a signal, which is configured to execute the method in the second aspect or any possible implementation of the second aspect. Specifically, the apparatus includes a unit configured to execute the method in the second aspect or any possible implementation of the second aspect.

A fifth aspect provides an apparatus for transmitting a signal, which may include: a receiver, a transmitter, a memory, a processor and a bus system, where the receiver, the transmitter, the memory and the processor are connected via the bus system; the memory is configured to store instructions; the processor is configured to execute the instructions stored by the memory so as to control the receiver to receive a signal and control the transmitter to transmit a signal; and when the processor executes the instructions stored by the memory, the processor executes the method in the first aspect or any possible implementation of the first aspect.

A sixth aspect provides an apparatus for transmitting a signal, which may include: a receiver, a transmitter, a memory, a processor and a bus system, where the receiver, the transmitter, the memory and the processor are connected via the bus system; the memory is configured to store instructions; the processor is configured to execute the instructions stored by the memory so as to control the receiver to receive a signal and control the transmitter to transmit a signal; and when the processor executes the instruction stored by the memory, the processor executes the method in the sixth aspect or any possible implementation of the sixth aspect.

A seventh aspect provides a computer readable medium, which is configured to store a computer program; and the computer program includes instructions for executing the method in the first aspect or any possible implementation of the first aspect.

An eighth aspect provides a computer readable medium, which is configured to store a computer program; and the computer program includes instructions for executing the method in the second aspect or any possible implementation of the second aspect.

BRIEF DESCRIPTION OF DRAWINGS

In order to describe the technical solutions in the embodiments of the disclosure more clearly, a simple introduction on the accompanying drawings which are needed in the description of the embodiments is given below. Apparently, the accompanying drawings in the description below are merely some of the embodiments of the disclosure, based on which other drawings may be obtained by those of ordinary skill in the art without any creative effort.

DETAILED DESCRIPTION

A clear and complete description of the technical solutions in the disclosure will be given below, in combination with the accompanying drawings in the embodiments of the disclosure. Apparently, the embodiments described below are a part, but not all, of the embodiments of the disclosure. All of the other embodiments, obtained by those of ordinary skill in the art based on the embodiments of the disclosure without any inventive efforts, fall into the protection scope of the disclosure.

It should be understood that the technical solutions of the disclosure may be applied in various communications systems, such as a Global System of Mobile communication (abbreviated as "GSM") system, a Code Division Multiple Access (abbreviated as "CDMA") system, a Wideband Code Division Multiple Access (abbreviated as "WCDMA") system, a General Packet Radio Service (abbreviated as "GPRS") system, an LTE system, an LTE Frequency Division Duplex (abbreviated as "FDD") system, an LTE Time Division Duplex (abbreviated as "TDD") system, a Universal Mobile Telecommunication System (abbreviated as "UMTS") system, a Worldwide Interoperability for Microwave Access (abbreviated as "WiMAX") communication system or a future possible communication system.

It should be further understood that, in the embodiments of the disclosure, the terminal device may be called User Equipment (Abbreviated as "UE"), a terminal device, a Mobile Station (Abbreviated as "MS"), a mobile terminal or a terminal device in a future 5G network. The terminal device may communicate with one or more core networks via a Radio Access Network (Abbreviated as "RAN"). For example, the terminal may be a mobile phone (or referred to as a cellular phone) or a computer having a mobile terminal, etc. For example, the terminal may further be a portable, pocketed, handheld, computer built-in or vehicle-amounted mobile apparatus that exchanges voice and/or data with a wireless access network.

The network device may be used for communicating with a mobile device. The network device may be a Base Transceiver Station (Abbreviated as "BTS") in a GSM or CDMA, may also be a NodeB (NB) in a WCDMA, or may be an Evolutional NodeB (eNB or eNodeB) in an LTE or a relay station, an access point, a vehicle-amounted device, a wearable device as well as an access network device in a future 5G network.

Figure 1:
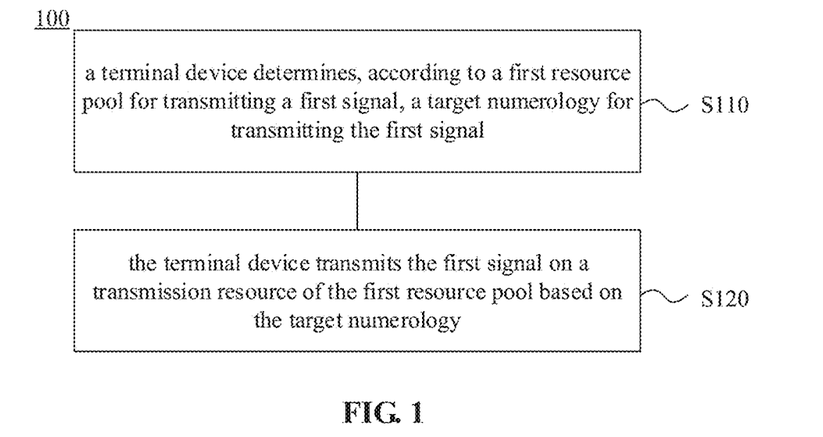
FIG. 1 illustrates a schematic diagram of a method for transmitting a signal according to an embodiment of the disclosure.

FIG. 1 illustrates a schematic flowchart of a method 100 for transmitting a signal according to an embodiment of the disclosure. FIG. 1 illustrates actions or operations of the method for transmitting the signal. However, these actions or operations are merely illustrated as examples. Other operations or variations of each operation in FIG. 1 may further be executed in the embodiments of the disclosure. The method 100 may include the following operations.

At S110, a terminal device determines, according to a first resource pool for transmitting a first signal, a target numerology for transmitting the first signal.

At S120, the terminal device transmits the first signal on a transmission resource of the first resource pool based on the target numerology.

Alternatively, in the action S110, the terminal device may determine the target numerology for transmitting the first signal according to a mapping relationship between basic numerologies and resource pools. Of course, the terminal device may also determine the target numerology for transmitting the first signal according to a preset internal relationship or logic relationship between the basic numerologies and the resource pools. Of course, the terminal device may also determine the target numerology for transmitting the first signal according to the first resource pool by using other manners.

Therefore, the terminal device may obtain the target numerology corresponding to the first resource pool and then the terminal device transmits the first signal based on the target numerology by using the transmission resource in the first resource pool. In this way, the terminal device may determine the target numerology corresponding to the resource pool, so as to avoid the terminal device from being allocated a fixed numerology as in the prior art. Since the terminal device may determine the target numerology corresponding to the first signal according to the first resource pool, the flexibility of the terminal device to select the numerology may also be improved.

Further, different basic numerologies may be selected for different services. For example, when the first signal is of a first service type, a first numerology is selected; and when the first signal is of a second service type, a second numerology is selected. In this way, the requirements of different services can be met.

The terminal device acquires a mapping relationship between at least one resource pool and at least one numerology, where the mapping relationship is used for indicating that each resource pool in the at least one resource pool is mapped to one numerology in the at least one numerology.

Alternatively, the first signal may be a random access signal, and may be, for example, a preamble signal or a Physical Random Access Channel (abbreviated as "PRACH"), or may be a data signal or a Physical Uplink Control Channel (abbreviated as "PUCCH" or Schedule Request), which is not defined by this embodiment of the disclosure.

As an alternative embodiment, before the action S110, the method 100 may further include: the terminal device acquires a mapping relationship between at least one resource pool and at least one numerology, where the mapping relationship is used for indicating that each resource pool in the at least one resource pool is mapped to one numerology in the at least one numerology, and the at least one resource pool includes the first resource pool; and the action S110 includes: the terminal device determines the target numerology for transmitting the first signal in the at least one numerology according to the first resource pool and the mapping relationship.

As an alternative embodiment, the terminal device may obtain the mapping relationship between the at least one resource pool and the at least one numerology via two manners. The first manner is that the network device transmits first indication information to the terminal device, where the first indication information is used for indicating the mapping relationship; and the terminal device receives the first indication information, and obtains a mapping relationship between N resource pools and the at least one numerology according to the first indication information. Specifically, the network device may transmit the first indication information via user dedicated signaling, or transmit the first indication information via DCI, and the terminal device receives the first indication information via the user dedicated signaling, or receives the first indication information via the DCI. Of course, the network device may also transmit the first indication information via another manner specified by a protocol, and the terminal device may also receive the first indication information from the network device via a manner specified by the protocol, all of which are not limited by this embodiment of the disclosure. The second manner is that the terminal device may obtain the mapping relationship between the N resource pools and the at least one numerology according to a self-kept mapping relationship. It should be understood that the mapping relationship may be only obtained by the terminal device once, and when the first resource pool is subsequently determined according to own adopted basic numerologies, the mapping relationship is used to determine the first resource pool.

It should be understood that the mapping relationship between the at least one resource pool and the at least one numerology may be that one resource pool in the at least one resource pool is mapped to one numerology, or one numerology is mapped to one or more resource pools, i.e., different resource pools are mapped to a same numerology, in other words, the number of the resource pools is greater than or equal to the number of basic numerologies.

Alternatively, the first resource pool and/or each resource pool in the at least one resource pool includes at least one transmission resource; each transmission resource in the at least one transmission resource includes: a physical time frequency resource and/or a sequence resource, where the sequence resource may be a sequence in a sequence group, or may be a codeword in a codebook, or may be an interlaced pattern. Still further, transmission resources in each resource pool in the N resource pools are orthogonal to each other; each resource pool in the N resource pools is orthogonal to each other, which mean that the physical time frequency resources are orthogonal to each other, or the sequence resources are orthogonal to each other, or may mean that the physical time frequency resources are orthogonal to each other and the sequence resources are orthogonal to each other.

It should be further understood that the numerology in this embodiment of the disclosure, such as the target numerology and/or each numerology in the at least one numerology, may include: a subcarrier spacing, the number of subcarriers included in a system bandwidth, the number of subcarriers included in a PRB, the length of an OFDM symbol, the number of points of Fourier transform such as FFT or IFFT for generating an OFDM signal, the number of OFDM symbols included in a TTI, the number of TTIs included in a first time period, and a type of a CP of the first signal as well as the time length of the CP of the signal. The subcarrier spacing is a frequency spacing between adjacent subcarriers, such as 15 kHz and 60 kHz. The number of subcarriers under a special bandwidth may be, for example, the number of subcarriers corresponding to each possible system bandwidth. The number of subcarriers included in the PRB typically may be, for example, an integer multiple of 6 or 16. The number of OFDM symbols in the TTI may typically be, for example, an integer multiple of 2, 4 and 7 or may be an integer multiple of 14. The number of TTIs included in the first time period may be the number of TTIs included in a time length of 1 ms or 10 ms. The CP of the first signal may be a normal CP or an extended CP. The numerology may further include: a time length of the CP of the first signal.

Alternatively, for example, the target numerology and/or each numerology in the at least one numerology may further include: a basic parameter in a newly defined resource partitioning manner in a future network system; for example, the basic parameter may be a basic frequency domain unit, a basic frequency domain unit pattern, a subcarrier pattern, a position occupied by a reference symbol in a time domain unit, a TTI pattern within a unit period, a pattern of a sub-frame in a frame, a pattern of a time slot in the sub-frame and an OFDM pattern in the time slot, etc.

As an alternative embodiment, before the action S110, the method 100 may further include: the terminal device determines the first resource pool for transmitting the first signal. The terminal device determines the first resource pool for transmitting the first signal in the following eight manners.

The first manner: the terminal device determines the first resource pool for transmitting the first signal according to a service type of the first signal. For example, the network device and the terminal device may agree in advance that a resource pool 1 is used for a first service type and a resource pool 2 is used for a second service type; when the first signal is of the first service type, the terminal device determines the first resource pool to be the resource pool 1; and when the first signal is of the second service type, the terminal device determines the first resource pool to be the resource pool 2.

The second manner: the terminal device determines the first resource pool for transmitting the first signal according to a frequency band for transmitting the first signal. For example, the terminal device and the network device agree in advance that a first operating frequency band is mapped to a resource pool 3, and a second operating frequency band is mapped to a resource pool 4; when the terminal device transmits the first signal on the first operating frequency band, the terminal device determines the first resource pool to be the resource pool 3; and when the terminal device transmits the first signal on the second operating frequency band, the terminal device determines the first resource pool to be the resource pool 4.

The third manner: the terminal device determines the first resource pool for transmitting the first signal according to a path loss parameter between the terminal device and the network device. For example, the terminal device and the network device agree in advance that when the path loss parameter is greater than a first threshold value, a resource pool 5 is selected; and when the path loss parameter is smaller than the first threshold value, a resource pool 6 is selected. The terminal device judges whether the resource pool 5 or the resource pool 6 is selected to be the first resource pool according to the path loss parameter.

The fourth manner: the terminal device receives second indication information from the network device, where the second indication information is used for indicating the first resource pool for transmitting the first signal; and the terminal device determines the first resource pool for transmitting the first signal according to the second indication information. Alternatively, the network device may transmit the second indication information to the terminal device via user dedicated signaling, and the terminal device may receive the second indication information from the network device via the user dedicated signaling; the network device may transmit the second indication information via broadcast signaling, and the terminal device may also receive the second indication information from the network device via the broadcast signaling; the network device may transmit the second indication information to the terminal device via DCI, and the terminal device may receive the second indication information from the network device via the DCI. Of course, the network device may transmit the second indication information to the terminal device via other manners, and the terminal device may also receive the second indication information from the network device via other manners, all of which are not defined by this embodiment of the disclosure.

The fifth manner: the terminal device detects a second signal except for the first signal, and determines a resource pool used for the second signal to be the first resource pool for transmitting the first signal.

The sixth manner: the terminal device randomly selects one resource pool from the at least one resource pool to be the first resource pool for transmitting the first signal.

The seventh manner: the terminal device determines a resource pool index based on transmission parameters of the terminal device, and determines the first resource pool for transmitting the first signal from the at least one resource pool according to the resource pool index. For example, the resource pool index may be calculated according to an RNTI or a cell identity of the terminal device, and then the first resource pool for transmitting the first signal is determined from the at least one resource pool according to the resource index.

The eighth manner: the terminal device performs load measurement on the at least one resource pool, and selects a resource pool with a minimum load or a resource pool smaller than a first threshold value to be the resource pool for transmitting the first signal. For example, the terminal device measures a signal receiving power of each resource pool in the at least one resource pool and takes a resource pool with a minimum average signal receiving power to be the first resource pool; and if there are a plurality of transmission resources with the minimum average signal receiving power, any resource pool in the resource pool may be selected to transmit the first signal. Of course, any resource pool with the average signal receiving power smaller than a preset threshold value may also be selected to be the first resource for transmitting the first signal.

In the action S120, the terminal device transmits the first signal on the transmission resource of the first resource pool based on the target numerology. The operation that the terminal device transmits the first signal on the transmission resource of the first resource pool based on the target numerology may include that, the transmission resource for transmitting the first signal is determined in at least one transmission resource included in the first resource pool first, and then the first signal is transmitted. If the first resource pool only includes one transmission resource, the terminal device transmits the first signal on this transmission resource; if the first resource pool includes a plurality of transmission resources, there is a need to further select the resource for transmitting the first signal from the plurality of the transmission resources. Specifically, the transmission resource for transmitting the first signal may be determined from the at least one transmission resource included in the first resource pool in the following four manners.

The first manner: the terminal device randomly selects the transmission resource from the at least one transmission resource included in the first resource pool, to transmit the first signal.

The second manner: the terminal device determines a transmission resource index based on transmission parameters of the terminal device, for example, the transmission resource index may be calculated based on an RNTI of the terminal device or a cell identity of the terminal device, and determines, according to the transmission resource index, the transmission resource for transmitting the first signal from the at least one transmission resource included in the first resource pool for transmitting the first signal, and the first signal is transmitted on the transmission resource for transmitting the first signal.

The third manner: the terminal device keeps a pre-configured transmission resource index; the terminal device determines the transmission resource for transmitting the first signal from the at least one transmission resource included in the first resource pool for transmitting the first signal according to the pre-configured transmission resource index, and the first signal is transmitted on the resource for transmitting the first signal.

The fourth manner: the terminal device performs load measurement on the at least one transmission resource included in the first resource pool for transmitting the first signal, selects a transmission resource with a minimum load and transmits the first signal on the transmission resource with the minimum load. For example, the terminal device measures a signal receiving power of each transmission resource in the at least one transmission resource in the first resource pool, and takes a transmission resource with a minimum average signal receiving power to be the resource for transmitting the first signal, and if there are a plurality of transmission resources with the minimum average signal receiving power, any transmission resource may be selected from the plurality of transmission resources to transmit the first signal. Of course, any transmission resource with the average signal receiving power smaller than a preset threshold value may also be selected to be the resource for transmitting the first signal.

Therefore, with the method for transmitting the signal provided by this embodiment of the disclosure, the terminal device determines the target numerology corresponding to the first resource pool of the terminal device according to the mapping relationship between the resource pools and the basic numerologies and then the terminal device transmits the first signal on the transmission resource of the first resource pool based on the target numerology. In this way, the corresponding target numerology may be determined according to a signal transmitted by the terminal device, so as to avoid the terminal device from being allocated a fixed numerology as in the prior art. Since the terminal device may determine the target numerology corresponding to the first signal according to the first signal, the requirement of different services can be met; and meanwhile, the flexibility of the terminal device to select the numerology may also be improved.

For convenience of understanding, two specific examples will be described below but are not intended to limit this embodiment of the disclosure. The first example is as follows: the terminal device performs load measurement on a receiving signal power in at least one resource pool to determine a first resource pool, and the numerology is a subcarrier spacing. Specifically, the following actions are included.

At action 1, a network device transmits Radio Resource Control (RRC) signaling to a terminal device, where the RRC signaling carries first indication information. For example, the first indication information indicates N resource pools and a subcarrier spacing corresponding to each resource pool in the N resource pools, in which the N is greater than or equal to 1. Specifically, the first indication information may indicate: a start position and an end position of each resource pool in the N resource pools in frequency domain and sub-frames included in each resource pool. Each resource pool includes at least one time frequency resource, and each subcarrier is mapped to one resource pool. Of course, each subcarrier may be mapped to a plurality of resource pools. For the specific convenience, it is assumed that each subcarrier corresponds to one resource pool herein.

At action 2, the terminal device receives, via the RRC signaling, the first indication information from the network device, and the terminal device measures a signal receiving power of each resource pool in the N resource pools to obtain an average signal receiving power of the N resource pools, and selects a resource pool with a minimum average signal receiving power from the N resource pools to be the first resource pool for transmitting the signal, where the first resource pool includes at least one time frequency resource.

At action 3, the terminal device determines a target numerology for transmitting the first signal from at least one numerology according to the first resource pool and the first indication information.

At action 4, the terminal device randomly selects one time frequency resource from the at least one time frequency resource included in the first resource pool to transmit a random access signal based on the target numerology.

The second example is as follows: the terminal device acquires a mapping relationship via broadcast signaling, the terminal device determines a first resource pool from at least one resource pool according to a resource pool index and the numerology is a type of a CP. Specifically, the following actions are included.

At action 1, a network device broadcasts signaling to a terminal device, where the broadcast signaling carries first indication information, and the first indication information indicates N resource pools and a type of a CP corresponding to each resource pool in the N resource pools. Specifically, the first indication information may indicate: a start position and an end position of a frequency domain resource of each resource pool in the N resource pools, and sub-frames included in each resource pool. Each resource pool includes at least one transmission resource, each transmission resource includes a time frequency resource and a sequence resource, and each resource pool includes at least one sequence resource.

At action 2, the terminal device acquires the first indication information in the broadcast signaling after receiving the broadcast signaling broadcast by the network device. The terminal device may also receive DCI signaling from the network device, where the DCI signaling carries a resource pool index; and the terminal device determines the first resource pool from the N resource pools according to the resource pool index.

At action 3, the terminal device determines that the CP corresponding to the first resource pool is an extended CP according to the first indication information and the first resource pool.

At action 4, the terminal device calculates a transmission resource index according to an RNTI, and determines a transmission resource for transmitting a data signal from the at least one transmission resource included in the first resource pool according to the transmission resource index; and the terminal device transmits the data signal on the time frequency resource and the sequence resource included in the transmission resource.

The method for transmitting the signal according to the embodiments of the disclosure is described above in combination with FIG. 1. Hereinafter, an apparatus for transmitting the signal according to the embodiments of the disclosure will be described in combination with FIG. 2 and FIG. 3.

Figure 2:
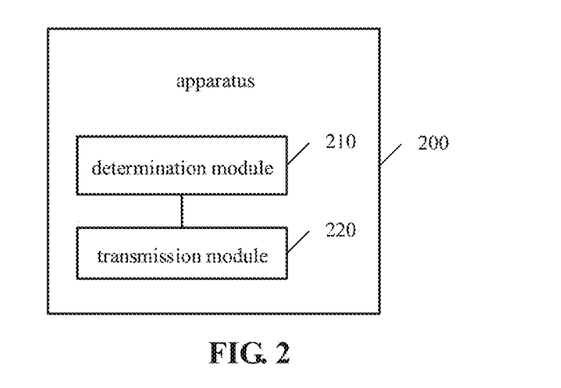
FIG. 2 illustrates a schematic block diagram of an apparatus for transmitting a signal according to an embodiment of the disclosure.

FIG. 2 illustrates a schematic diagram of an apparatus 200 for transmitting a signal according to an embodiment of the disclosure. The apparatus may be, for example, the terminal device in the method 100. The apparatus 20X) may include: a determination module 210 and a transmission module 220.

The determination module 210 is configured to determine, according to a first resource pool for transmitting a first signal, a target numerology for transmitting the first signal.

The transmission module 220 is configured to transmit the first signal on a transmission resource of the first resource pool based on the target numerology.

As an alternative embodiment, the apparatus 20X) may further include: an acquisition module, configured to acquire, before the target numerology for transmitting the first signal is determined according to the first resource pool for transmitting the first signal, a mapping relationship between at least one resource pool and at least one numerology. The mapping relationship is used for indicating that each resource pool in the at least one resource pool is mapped to one numerology in the at least one numerology, and the at least one resource pool includes the first resource pool. The determination module 210 is specifically configured to determine the target numerology for transmitting the first signal from the at least one numerology according to the first resource pool and the mapping relationship.

As an alternative embodiment, the acquisition module is specifically configured to receive first indication information from a network device, where the first indication information is used for indicating the mapping relationship; and acquire the mapping relationship between the at least one resource pool and the at least one numerology according to the first indication information.

As an alternative embodiment, the determination module 210 is further configured to: determine, before the target numerology for transmitting the first signal is determined according to the first resource pool for transmitting the first signal, the first resource pool for transmitting the first signal.

As an alternative embodiment, the determination module 210 is specifically configured to: receive second indication information from the network device, where the second indication information is used for indicating the first resource pool for transmitting the first signal; and determine the first resource pool for transmitting the first signal according to the second indication information.

As an alternative embodiment, the determination module 210 is specifically configured to determine the first resource pool for transmitting the first signal according to at least one of a service type of the first signal, a frequency band or a path loss parameter.

As an alternative embodiment, the determination module 210 is specifically configured to randomly select one resource pool from the at least one resource pool as the first resource pool for transmitting the first signal.

Or, the determination module 210 is specifically configured to determine a resource pool index based on transmission parameters of the terminal device, and determine the first resource pool for transmitting the first signal from the at least one resource pool according to the resource pool index.

Or, the determination module 210 is specifically configured to perform load measurement on the at least one resource pool and selects a resource pool with a minimum load or a resource pool smaller than a first threshold value to be the resource pool for transmitting the first signal.

Or, the determination module 210 is specifically configured to detect a second signal except for the first signal, and determine a resource pool adopted by the second signal to be the first resource pool for transmitting the first signal.

As an alternative embodiment, the transmission module 220 is specifically configured to randomly select the transmission resource from at least one transmission resource included in the first resource pool based on the target numerology to transmit the first signal.

Or, the transmission module 220 is specifically configured to determine a transmission resource index based on transmission parameters of the apparatus 200 and determine the transmission resource for transmitting the first signal from the at least one transmission resource included in the first resource pool according to the transmission resource index, and transmit the first signal on the transmission resource for transmitting the first signal based on the target numerology.

Or, the transmission module 220 is specifically configured to determine the transmission resource for transmitting the first signal from the at least one transmission resource included in the first resource pool for transmitting the first signal according to a pre-configured transmission resource index, where the apparatus 200 transmits the first signal on the transmission resource for transmitting the first signal based on the target numerology.

Or, the transmission module 220 is specifically configured to perform load measurement on the at least one transmission resource included in the first resource pool, select a transmission resource with a minimum load or a transmission resource smaller than a second threshold value from the at least one transmission resource included in the first resource pool, and transmit the first signal on the transmission resource with the minimum load or the transmission resource smaller than the second threshold value based on the target numerology.

As an alternative embodiment, the resource pool includes at least one transmission resource; and each transmission resource in the at least one transmission resource includes: a physical time frequency resource and/or a sequence resource.

As an alternative embodiment, the numerology includes at least one of the following: a subcarrier spacing, the number of subcarriers included in a system bandwidth, the number of subcarriers included in a PRB, the length of an OFDM symbol, the number of points of FFT or IFFT for generating an OFDM signal, the number of OFDM symbols included in a TTI, the number of TTIs included in a first time period, and a type of a CP of the first signal.

As an alternative embodiment, the first signal is a random access signal or a data signal or an uplink control signal.

Figure 3:
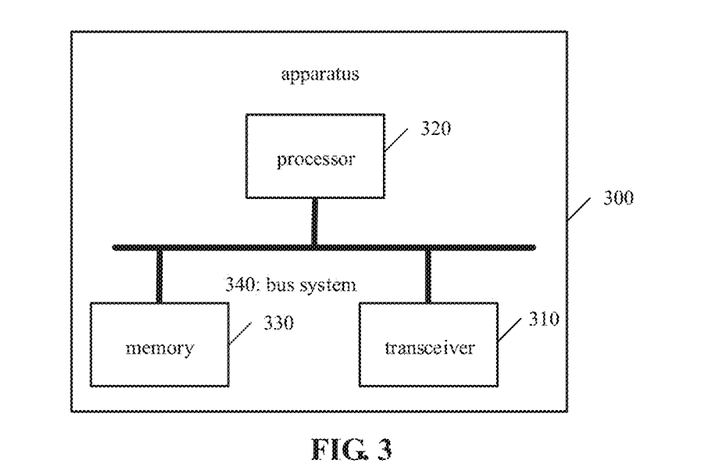
FIG. 3 illustrates a schematic block diagram of another apparatus for transmitting a signal according to an embodiment of the disclosure.

FIG. 3 illustrates a schematic diagram of an apparatus 300 for transmitting a signal according to an embodiment of the disclosure. The apparatus 300 may be, for example, the terminal device in the method 100. The apparatus 200 may include a transceiver 310, a processor 320, a memory 330 and a bus system 340, where the transceiver 310, the processor 320 and the memory 330 are connected via the bus system 340, the memory 330 is configured to store instructions, and the processor 320 is configured to execute the instructions stored by the memory 330 so as to control the transceiver 310 to transmit or receive a signal.

The processor 320 is configured to determine, according to a first resource pool for transmitting a first signal, a target numerology for transmitting the first signal, and the transceiver 310 is configured to transmit the first signal on a transmission resource of the first resource pool based on the target numerology.

As an alternative embodiment, the transceiver 310 may further configured to: acquire, before the target numerology for transmitting the first signal is determined according to the first resource pool for transmitting the first signal, a mapping relationship between at least one resource pool and at least one numerology, where the mapping relationship is used for indicating that each resource pool in the at least one resource pool is mapped to one numerology in the at least one numerology, and the at least one resource pool includes the first resource pool; and the processor 320 is specifically configured to: determine the target numerology for transmitting the first signal from the at least one numerology according to the first resource pool and the mapping relationship.

As an alternative embodiment, the transceiver 310 is further configured to: receive first indication information from a network device, where the first indication information is used for indicating the mapping relationship; and acquire the mapping relationship between the at least one resource pool and the at least one numerology according to the first indication information.

As an alternative embodiment, the processor 320 is further configured to: determine, before the target numerology for transmitting the first signal is determined according to the first resource pool for transmitting the first signal, the first resource pool for transmitting the first signal.

As an alternative embodiment, the processor 320 is specifically configured to: receive second indication information from the network device, where the second indication information is used for indicating the first resource pool for transmitting the first signal; and determine the first resource pool for transmitting the first signal according to the second indication information.

As an alternative embodiment, the processor 320 is specifically configured to: determine the first resource pool for transmitting the first signal according to at least one of a service type of the first signal, a frequency band, or a path loss parameter. As an alternative embodiment, the processor 320 is specifically configured to: randomly select one resource pool from the at least one resource pool to be the first resource pool for transmitting the first signal.

Or, the processor 320 is specifically configured to determine a resource pool index based on transmission parameters of the terminal device, and determine the first resource pool for transmitting the first signal from the at least one resource pool according to the resource pool index.

Or, the processor 320 is specifically configured to perform load measurement on the at least one resource pool and selects a resource pool with a minimum load or a resource pool smaller than a first threshold value to be the resource pool for transmitting the first signal.

Or, the processor 320 is specifically configured to detect a second signal except for the first signal, and determine a resource pool used for the second signal to be the first resource pool for transmitting the first signal.

As an alternative embodiment, the transceiver 310 is specifically configured to randomly select the transmission resource from at least one transmission resource included in the first resource pool based on the target numerology to transmit the first signal.

Or, the transceiver 310 is specifically configured to determine a transmission resource index based on transmission parameters of the apparatus 300 and determine the transmission resource for transmitting the first signal from the at least one transmission resource included in the first resource pool according to the transmission resource index, and transmit the first signal on the transmission resource for transmitting the first signal based on the target numerology.

Or, the transceiver 310 is specifically configured to determine the transmission resource for transmitting the first signal from the at least one transmission resource included in the first resource pool for transmitting the first signal according to a pre-configured transmission resource index, where the apparatus 300 transmits the first signal on the transmission resource for transmitting the first signal based on the target numerology.

Or, the transceiver 310 is specifically configured to perform load measurement on the at least one transmission resource included in the first resource pool, select a transmission resource with a minimum load or a transmission resource smaller than a second threshold value in the at least one transmission resource included in the first resource pool, and transmit the first signal on the transmission resource with the minimum load or the transmission resource smaller than the second threshold value based on the target numerology.

As an alternative embodiment, the resource pool includes at least one transmission resource; and each transmission resource in the at least one transmission resource includes: a physical time frequency resource and/or a sequence resource.

As an alternative embodiment, the numerology includes at least one of the following: a subcarrier spacing, the number of subcarriers included in a system bandwidth, the number of subcarriers included in a PRB, the length of an OFDM symbol, the number of points of FFT or IFFT for generating an OFDM signal, the number of OFDM symbols included in a TTI, the number of TTIs included in a first time period, or a type of a CP of the first signal.

As an alternative embodiment, the first signal is a random access signal or a data signal or an uplink control signal.

It should be understood that, in this embodiment of the disclosure, the processor 320 may be a Central Processing Unit (CPU); the processor may further be other universal processors, a Digital Signal Processor (DSP), an Application Specific Integrated Circuit (ASIC) and a Field Programmable Gate Array (FPGA) or other programmable logic devices, discrete gates or transistor logic devices, discrete hardware component and the like. The universal processor may be a microprocessor or the processor may also be any conventional processor, etc.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in each embodiment of the disclosure, sequence numbers of the foregoing processes do not mean execution sequences in various embodiments of the disclosure. The execution sequences of the processes should be determined according to functions and internal logic of the processes, and should not be construed as any limitation on the implementation processes of the embodiments of the disclosure.

A person of ordinary skill in the art may be aware that, in combination with the examples described in the embodiments disclosed in this specification, units and algorithm actions may be implemented by electronic hardware, computer software or a combination of computer software and electronic hardware. In order to describe the interchangeability between hardware and software, the constitutions and actions of each example are described generally according to functions in the above description. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the disclosure essentially, or the part contributing to the prior art, or some of the technical solutions may be implemented in a form of a software product. The software product is stored in a storage medium and includes several instructions for instructing a computer device (which may be a personal computer, a server, or a network device) to perform all or some of the actions of the methods described in the embodiments of the disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of the disclosure but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. A method for transmitting a signal, comprising:
receiving, by a terminal device, first indication information from a network device,
wherein the first indication information indicates a mapping relationship between at least one resource pool and at least one set of a type of a Cyclic Prefix (CP) and subcarrier spacing;
acquiring, by the terminal device, the mapping relationship according to the first indication information;
receiving, by the terminal device, second indication information from the network device in a different communication process from that of the first indication information, wherein the second indication information is used for indicating a first resource pool for transmitting a first signal; wherein the first signal is an uplink data signal or a physical uplink control channel (PUCCH);
determining, by the terminal device, the first resource pool for transmitting the first signal according to the second indication information;
determining, by the terminal device, according to the first resource pool for transmitting the first signal and the acquired mapping relationship, a type of the CP and subcarrier spacing for transmitting the first signal from the at least one set of the type of the CP and subcarrier spacing; and
determining, by the terminal device, the transmission resource for transmitting the first signal from the at least one transmission resource comprised in the first resource pool for transmitting the first signal according to a pre-configured transmission resource index, and transmitting, by the terminal device, the first signal on the transmission resource for transmitting the first signal based on the type of the CP and subcarrier spacing.

2. The method of claim 1, wherein the resource pool comprises at least one transmission resource; and each transmission resource in the at least one transmission resource comprises at least one of a physical time frequency resource or a sequence resource.

3. A terminal apparatus for transmitting a signal, comprising:
a processor, a transceiver; and
a memory storing instructions, which, when executed by the processor, cause the processor and the transceiver to perform one or more actions comprising:
receiving first indication information from a network device;
wherein the first indication information indicates a mapping relationship between at least one resource pool and at least one set of a type of a Cyclic Prefix (CP) and subcarrier spacing;
acquiring the mapping relationship according to the first indication information;
receiving second indication information from the network device in a different communication process from that of the first indication information, wherein the second indication information is used for indicating a first resource pool for transmitting a first signal; wherein the first signal is an uplink data signal or a physical uplink control channel (PUCCH);
determining the first resource pool for transmitting the first signal according to the second indication information;
determining, according to the first resource pool for transmitting the first signal and the acquired mapping relationship, a type of the CP and subcarrier spacing for transmitting the first signal from the at least one set of the type of the CP and subcarrier spacing; and
determining the transmission resource for transmitting the first signal from the at least one transmission resource comprised in the first resource pool for transmitting the first signal according to a pre-configured transmission resource index, wherein the apparatus transmits the first signal on the transmission resource for transmitting the first signal based on the type of the CP and subcarrier spacing.

4. The apparatus of claim 3, wherein the resource pool comprises at least one transmission resource; and each transmission resource in the at least one transmission resource comprises at least one of a physical time frequency resource or a sequence resource.

5. The method of claim 1,
wherein receiving, by the terminal device, the first indication information from the network device comprises:
receiving, by the terminal device, the first indication information from the network device via user dedicated signaling; and
wherein receiving, by the terminal device, the second indication information comprises:
receiving, by the terminal device, the second indication information via downlink control information (DCI)
wherein the type of the CP includes a regular CP or an extended CP.

6. The apparatus of claim 3,
wherein receiving the first indication information from the network device comprises:
receiving the first indication information from the network device via user dedicated signaling; and
wherein receiving the second indication information comprises:
receiving the second indication information via downlink control information (DCI)
wherein the type of the CP includes a regular CP or an extended CP.

7. A network apparatus for transmitting a signal, comprising:
a processor, a transceiver; and
a memory storing instructions, which, when executed by the processor, cause the processor and the transceiver to perform one or more actions comprising:
sending first indication information to a terminal device;
wherein the first indication information indicates a mapping relationship between at least one resource pool and at least one set of a type of a Cyclic Prefix (CP) and subcarrier spacing;
sending second indication information to the terminal device in a different communication process from that of the first indication information, wherein the second indication information is used for indicating a first resource pool for transmitting a first signal; wherein the first signal is an uplink data signal or a physical uplink control channel (PUCCH);
wherein the first resource pool for transmitting the first signal is determined according to the second indication information; and
wherein the type of the CP and subcarrier spacing for transmitting the first signal are determined, according to the first resource pool for transmitting the first signal and the acquired mapping relationship, from the at least one set of the type of the CP and subcarrier spacing;

wherein the transmission resource for transmitting the first signal is determined, according to a pre-configured transmission resource index, from the at least one transmission resource comprised in the first resource pool for transmitting the first signal;

receiving the first signal on the transmission resource for transmitting the first signal based on the type of the CP and subcarrier spacing.

\* \* \* \* \*